Aug. 9, 1938.  W. E. URSCHEL ET AL  2,126,361
VEGETABLE SHREDDER AND SLICER
Filed March 30, 1936  4 Sheets-Sheet 1

INVENTORS.
William E. Urschel
Joe Richard Urschel
By: Cox & Moore ATTORNEYS.

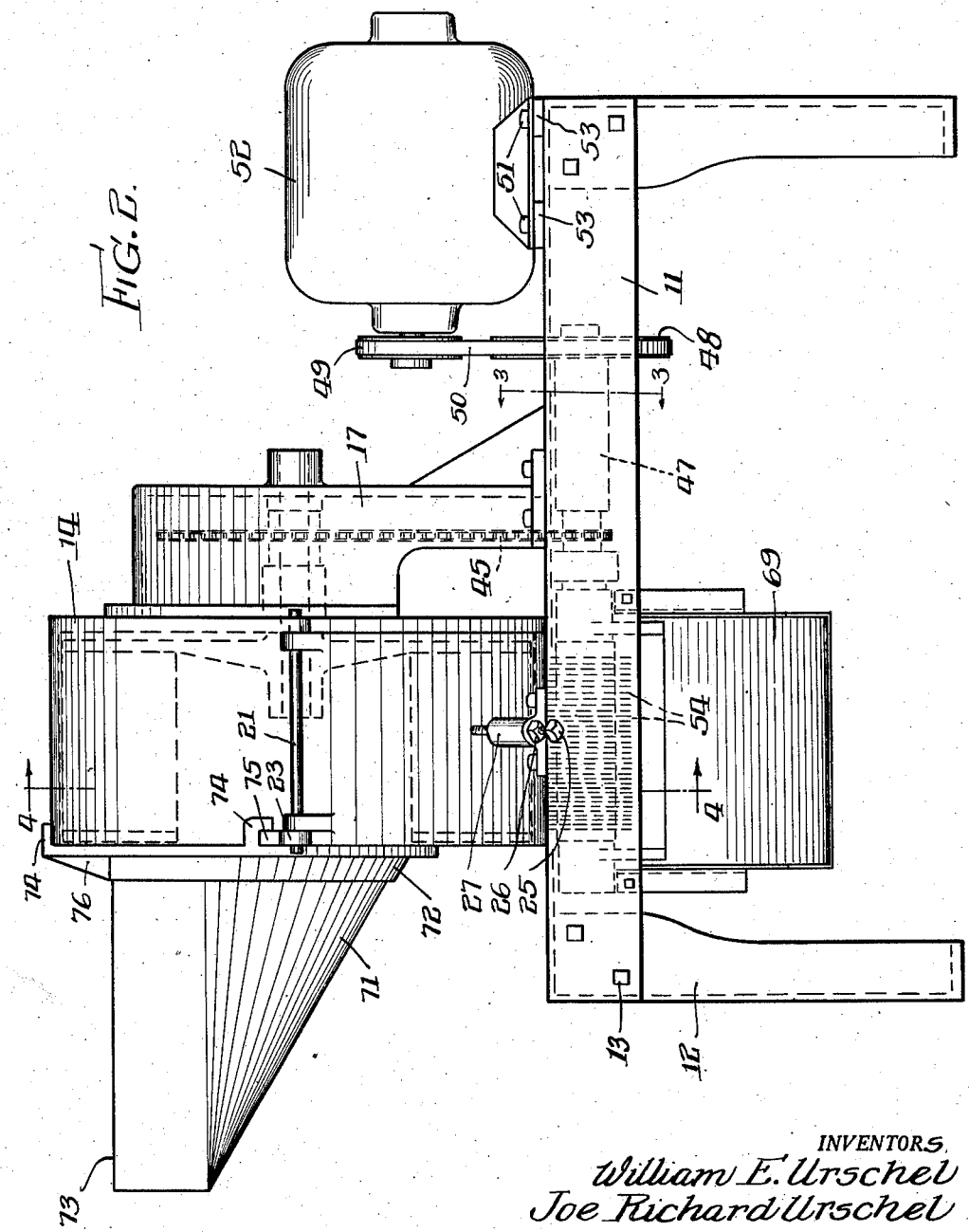

Aug. 9, 1938.   W. E. URSCHEL ET AL   2,126,361
VEGETABLE SHREDDER AND SLICER
Filed March 30, 1936   4 Sheets-Sheet 3
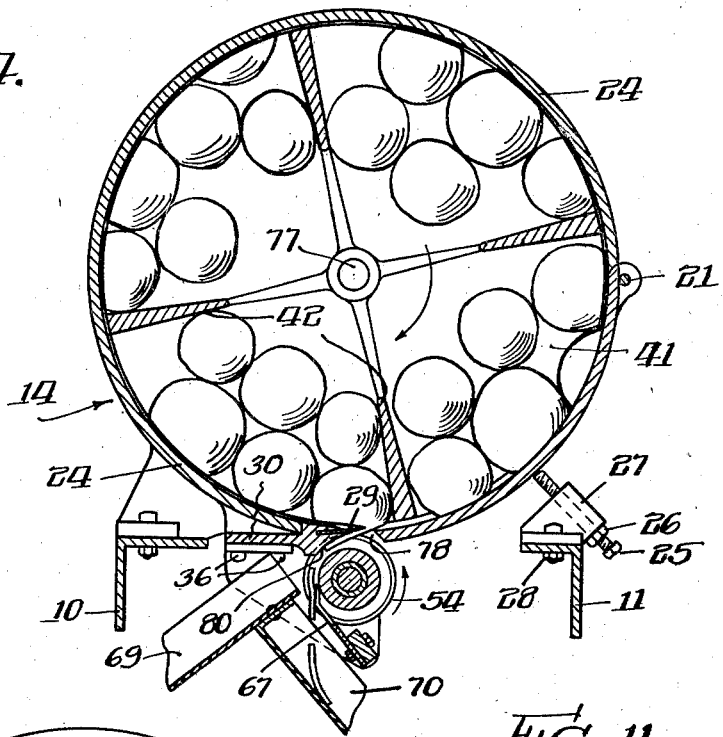
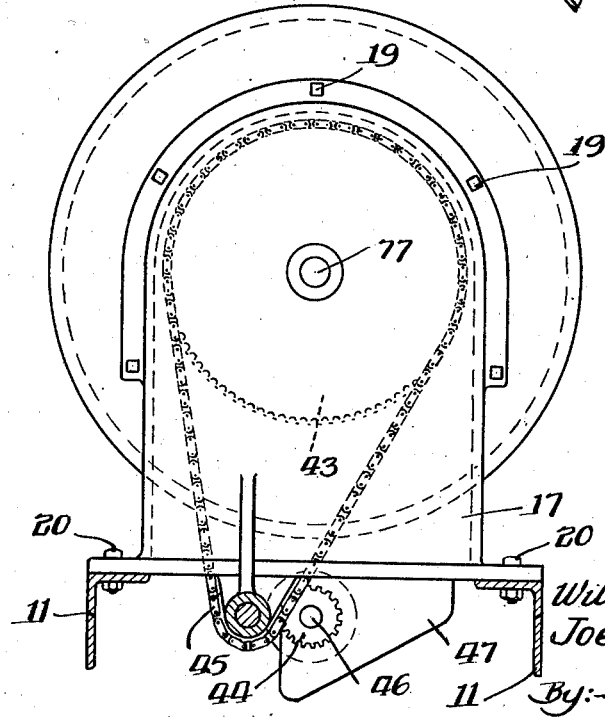
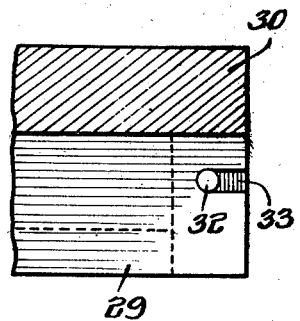
INVENTORS
William E. Urschel
Joe Richard Urschel
By:- Cox & Moore  ATTORNEYS.

Aug. 9, 1938.   W. E. URSCHEL ET AL   2,126,361
VEGETABLE SHREDDER AND SLICER
Filed March 30, 1936   4 Sheets-Sheet 4
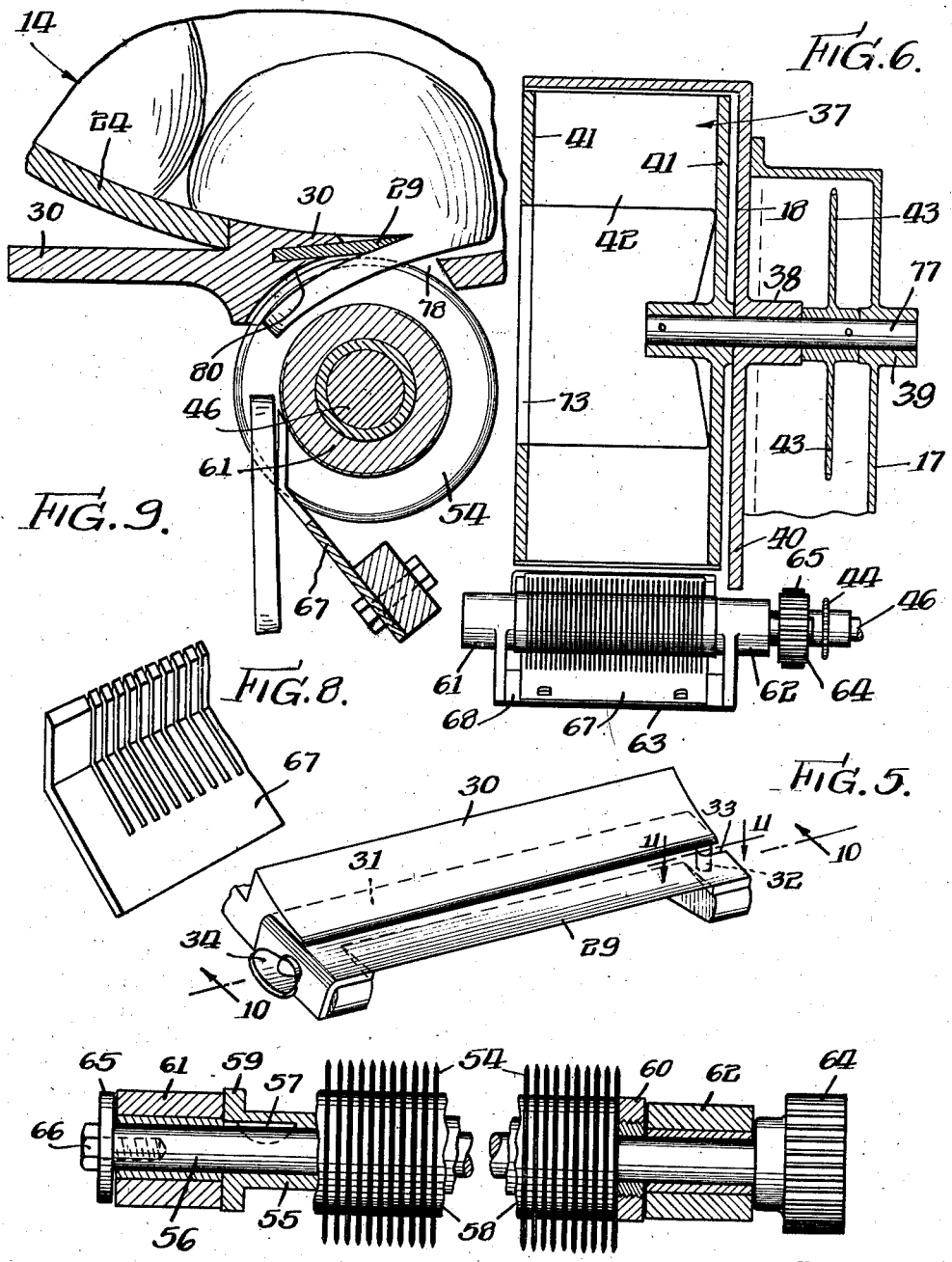
INVENTORS
William E. Urschel
Joe Richard Urschel
By:- Cox & Moore ATTORNEYS.

Patented Aug. 9, 1938

2,126,361

UNITED STATES PATENT OFFICE 2,126,361

VEGETABLE SHREDDER AND SLICER

William E. Urschel and Joe Richard Urschel, Valparaiso, Ind.

Application March 30, 1936, Serial No. 71,570

12 Claims. (Cl. 146—78)

This invention relates to vegetable and fruit slicers and shredders.

One of the objects of the present invention is to provide mechanism for cutting vegetables and fruit, particularly vegetables, into strips of uniform cross section, and particularly rectangular cross section, wherein the product is popularly known as "shoe string" carrots, potatoes, beets, or whatever the commodity is.

Among additional objects of the invention are to provide a machine for producing a product of the foregoing description, wherein the cutting action is accomplished by the utilization of centrifugal force which constantly presses the fruit or vegetables, without bruising the same, forcibly against a slicing knife for cutting the fruit or vegetables; to provide an improved method and apparatus for slicing fruit and vegetables wherein centrifugal force is utilized for feeding and slicing the fruit or vegetables into first sheetlike form and then into elongated strips, all in a continuous action and with minimum injury to the fruits or vegetables; to provide an improved method and means for feeding fruits and/or vegetables in an automatic manner, and without damage thereto, to a slicing mechanism for continuously and automatically slicing the product into first sheet-like form and then into elongated strips in the nature of so-called "shoe strings"; to provide these and other objects of invention which will be apparent from a perusal of the following specification when taken in connection with the accompanying drawings.

Referring now to the drawings:

Figure 2 is a side elevation of such machine;

Figure 3 is a section taken on the line 3—3 of Figure 2;

Figure 4 is a section of the drum taken on line 4—4 of Figure 2;

Figure 5 is a perspective view of the knife and holder;

Figure 6 is a vertical section of the drum and an elevation of the cutting instrumentalities;

Figure 7 illustrates the cutter assembly in partial section;

Figure 8 is a partial perspective view of the strip ejector;

Figure 9 is a side sectional view taken through the stationary slicing bar and the rotating cutter;

Figure 11 is a plan section on line 11—11 of Figure 5.

Figure 1:
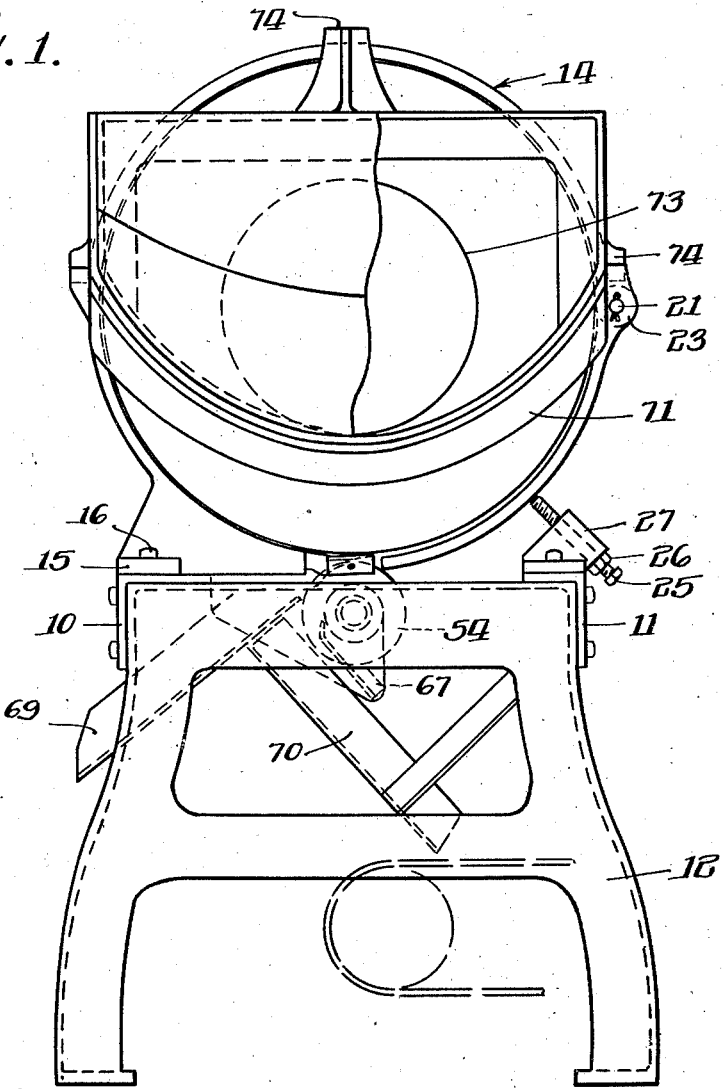
Figure 1 is an elevation of the front end of one of the embodiments of the apparatus for carrying out the invention.
Figure 10:
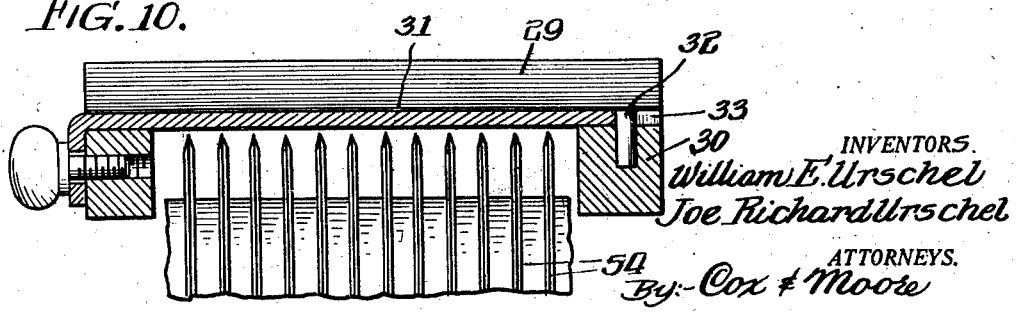
Figure 10 is a sectional view taken through the mechanism for holding the slicing bar 29 in position.

The main frame of the machine consists of two elongated side members 10 and 11 held in spaced relation by the two identical end frame members 12 transversely disposed at their extremities and secured together by bolts 13.

An upright, transversely disposed drum 14 is mounted upon the left portion of the longitudinal frame member 10 by means of two preferably integral leg-like projections 15 disposed one at each end of said drum. Bolts 16 secure the legs 15 to the frame member 10. Additional support for the drum is provided by the combined support and chain guard member 17, secured to the head 18 of drum 14 by bolts 19. Bolts 20 serve to secure the transverse support 17 to the frame members 10 and 11.

A considerable portion of the circumferential wall portion of the drum 14 is hinged upon a rod 21, as shown clearly in Figure 4, whereby the free lower end of the arcuate wall 24 may be adjustably moved inwardly or outwardly with respect to the axis of drum 14. The pintle 21 is secured in lugs 23 mounted upon the fixed arcuate wall 24 of drum 14 by means of cotter pins fixed at its extremities. The movable arcuate wall portion is positioned by an adjusting screw 25 maintained in desired position by lock nut 26. This adjusting screw cooperates with a threaded aperture in bracket 27 secured to frame member 11 by bolts 28.

A knife or cutting means 29 transversely disposed at the lower extremity of wall 24 of the drum 14 is held in position by suitable holding means 30. Knife 29 is positioned in holder 30 by slot 31 and pin 32 cooperating with slots 33 at one extremity of the knife. A thumb screw or lock nut 34 serves to secure the knife 29 in its holder 30. This holder 30 in turn is fastened to a boss positioned at the lower portion of the drum wall 24 by means of cap screws 36 (see Figure 4).

Drum 14 is equipped with a rotor 37 fixed or keyed to a shaft 77, which shaft is journaled in suitable bearings 38 and 39 disposed at the end wall of the face 40 of the drum 14 and the support member 17, respectively. Rotor 37 consists of two disc-like portions 41 and 41 held in fixed relation by radial paddles 42. As shown in Figure 4 these paddles extend inwardly, terminating considerably short of the center axis of the rotor, thereby providing a series of pockets, in the present instance four in number, into which the vegetables or fruit are fed as hereinafter explained, the paddles serving to divide up the drum into sections and providing radially extending abutments which assist the centrifugal action caused by rotation of the paddles in propelling the fruit and/or vegetables outwardly against the pivotally mounted wall portion 24 of the drum.

A chain sprocket 43 pinned to shaft 77 is driven by means of sprocket 44 through chain 45. The sprocket 44 is pinned to shaft 46 journaled in bearing 47 integral with the lower portion of support 17. Pulley 48 conventionally secured to the other extremity of shaft 46 is driven by motor pulley 49 through V belt 50. Bolts 51 secure motor 52 and transverse motor supports 53 to the longitudinal frame members 10 and 11.

Directly beneath knife 29 are a series of equally spaced disc cutters 54 transversely disposed with respect to the opening 78 hereinafter referred to. Disc cutters 54 and washers 58 serving to hold said cutters in spaced relation are mounted upon the tubular holder 55. A nut 60 engaging with the threaded extremity of holder 55 secures these cutters 54 and washers 58 upon said holder by holding them securely against integral shoulder 59. Holder 55 is secured to shaft 56 by key 57. Bearings 61 and 62 serve to journal shaft 56 in bracket 63. Spur gear 64 pinned at one end of shaft 56 and washer 65 secured to the other extremity by cap screw 66 serve to position shaft 56 in bearings 61 and 62. Spur gear 64 is driven by spur gear 65 keyed to hereinbefore described shaft 46.

An ejector 67, Figures 4 and 8, bolted to transverse bar 68 of bracket 63 has been provided to remove the vegetable strips lodged between cutters 54. Bracket 63 is secured to drum 14 by cap screws 36.

A feed hopper 71 riveted to frame 72 provides means for feeding vegetables into drum 14 through the circular opening 73 in rotor 37. Hopper frame 72 to which hopper 71 is secured is provided with hook projections 74 to engage with projections 75 positioned upon the forward rim of drum 14. Additional rigidity for frame 72 has been secured by the vertical arm 76 provided at its extremity with a pin which is loosely fitted into a circular aperture in the wall of the drum at that point. This arrangement enables the hopper 71 to be detached for cleaning or gaining access to the interior of drum 14.

Two discharge chutes 69 and 70, conventionally secured to longitudinal frame members 10 and 11, have been provided to direct cut vegetables toward and into suitable receptacles or conveyors.

In the operation of the machine, vegetables and/or fruits, half-fruits or sections, are placed in hopper 71 which feeds them into the rotor 37 of the stationary drum 14. The rotor drive sprocket 43 is driven by sprocket 44 through chain 45. Sprocket 44 is driven by motor 52 through pulleys 48 and 49 and the V belt 50.

Rotor 37 is revolved at such speed as to cause a centrifugal force greatly exceeding their weight to act upon the vegetables enclosed therein. The rotor is preferably driven in excess of 175 revolutions per minute to provide a centrifugal force of considerable degree. This centrifugal force causes the vegetables to constantly bear against the circumferential wall of drum 14, assuming positions illustrated by Figure 4. The high centrifugal force which propels the vegetables against the circumferential outer wall 14 is sufficient to keep the vegetables in constant engagement with the outer wall so that there is a repeated slicing of the vegetable upon each rotation of the drum. This is true, whether there are a plurality of vegetables in the pockets, or a single vegetable. In the case of a plurality of vegetables, they are in constant engagement with the wall 14 and are immediately adjacent each other. The rotation of the drum will cause the slicing knife 29 to have a continuous cutting action through each vegetable, whether there is one or a plurality thereof, until the vegetable is completely sliced throughout. Clockwise rotation of rotor 37 will cause the vegetables to impinge against the cutting edge of knife 29, thereby causing slices to be severed from the vegetables. The thickness of the slices is controlled by the size of opening 78 between the cutting edge of knife 29 and the extremity of the arcuate member 22. Adjusting screw 25 bearing against arcuate member 22 hinged upon rod 21 provides means for controlling the size of opening 78.

The cutters 54 are driven from the intermediate drive shaft 46 through the means of spur gears 64 and 65. In Figure 4, a portion of the cutting edges of cutters 54 are recessed in parallel arcuate grooves in knife holder 30. The slices cut by knife 29 are engaged by cutters 54 and as they are carried downwardly come in contact with the arcuate face 80 of holder 30. The engagement of the cutters 54 is simultaneous with the cutter 29 to provide a cutting action on the cut slice before the slice is completely severed from the vegetable. The cutter discs 54 have a further action in that they rotate at a speed which is greater than the speed of rotation of the rotor member 40. The cutters also rotate in the same direction that the cut slice is being fed. This direction of rotation and the increased speed of the discs 54 materially assist in pulling the cut slice into and past the cutters 54 with a great rapidity, to efficiently "shoe-string" the vegetable without any inhibitive movement thereof. This arcuate surface gradually forces the slices in between cutters 54 past their cutting edges, thereby cutting the slice into strips equal to the distance between the cutters. This forcing the slices inwardly beyond the cutting edges of the slicers insures a positive cut, leaving none of the strips hanging together.

The strips are forced out from between cutters 54 by ejector 67, causing the strips to fall upon the discharge chute 70. Chute 70 directs the cut vegetables toward and into a suitable receptacle or conveyor. Chips too small to become lodged between cutters 54 are thrown upon chute 69 and directed into a suitable receptacle or conveyor.

Illustrations and the description show but one set of cutting instrumentalities. Additional cutting instrumentalities and hinged wall portions may be added to the circumferential drum wall to increase the capacity of the machine.

A horizontally disposed drum with its rotor secured to a vertically disposed shaft may be substituted for the drum 14 shown.

To use the machine as a slicer, only bracket 63 supporting cutters 54 need be removed.

What we claim as new and desire to secure by Letters Patent of the United States is:

1. In an article treating device the combination of a drum having a relatively smooth inner wall, a section of the periphery of said drum being pivotally mounted whereby the free edge of said pivotally mounted section may be adjusted relatively to the opposed edge of the free edge of the remainder of the drum whereby to provide a slot between said opposed edges extending transversely of the smooth inner wall of the drum, means for adjusting the pivotal movement of said pivotally mounted wall section to determine the width of said slot, the wall of one of said drum sections being provided with a slicing knife extending transversely of the wall section, rotatable means disposed within said drum and having impeller means adapted to receive therebetween a quantity of commodity to be sliced whereby upon the rotation of said impeller members said commodity will be centrifuged against the inner smooth wall of said drum and forced to travel across the slicing knife disposed in said slot, and means for receiving and discharging a slice of the commodity as it passes through said slot, and a plurality of knives disposed at said slot and operatively associated with the slicing knife for cutting the slice into a plurality of elongated strips of predetermined cross-section, and means for deflecting the cut slices downward from between the knife blades.

2. In an article treating device the combination of a drum having a relatively smooth inner wall, a section of the periphery of said drum being pivotally mounted whereby the free edge of said pivotally mounted section may be adjusted relatively to the opposed edge of the free edge of the remainder of the drum whereby to provide a slot between said opposed edges extending transversely of the smooth inner wall of the drum, means for adjusting the pivotal movement of said pivotally mounted wall section to determine the width of said slot, the wall of one of said drum sections being provided with a slicing knife extending transversely of the wall section, rotatable means disposed within said drum and having impeller members adapted to receive therebetween a quantity of commodity to be sliced whereby upon the rotation of said impeller members said commodity will be centrifuged against the inner smooth wall of said drum and forced to travel across the slicing knife disposed in said slot, and means for receiving and discharging a slice of the commodity as it passes through said slot, and a gang of rotary cutters spaced apart and disposed beneath the underside of the slicing knife in cooperative arrangement with the slot and in position to receive the slice as it passes through said slot whereby to cut said slice into a plurality of elongated strips of predetermined cross-section, and means for deflecting the cut slices downward from between the knife blades.

3. In an article treating device the combination of a drum having a relatively smooth inner wall, a section of the periphery of said drum being pivotally mounted whereby the free edge of said pivotally mounted section may be adjusted relatively to the opposed edge of the free edge of the remainder of the drum whereby to provide a slot between said opposed edges extending transversely of the smooth inner wall of the drum, means for adjusting the pivotal movement of said pivotally mounted wall section to determine the width of said slot, the wall of one of said drum sections being provided with a knife carrier and a slicing knife extending transversely of the wall section, rotatable means disposed within said drum and having impeller means adapted to receive therebetween a quantity of commodity to be sliced whereby upon the rotation of said impeller members said commodity will be centrifuged against the inner smooth wall of said drum and forced to travel across the slicing knife disposed in said slot, and means for receiving and discharging a slice of the commodity as it passes through said slot, there being means disposed on the knife carrier at the discharge end of said slot and located between the rotating cutters for deflecting the slice wholly within the circumferential or peripheral planes of the rotating cutter blades.

4. In an article treating device the combination of a drum having a relatively smooth inner wall, a section of the periphery of said drum being pivotally mounted whereby the free edge of said pivotally mounted section may be adjusted relatively to the opposed edge of the free edge of the remainder of the drum whereby to provide a slot between said opposed edges extending transversely of the smooth inner wall of the drum, means for adjusting the pivotal movement of said pivotally mounted wall section to determine the width of said slot, the wall of one of said drum sections being provided with a knife carrier and a slicing knife extending transversely of the wall section, rotatable means disposed within said drum and having impeller members adapted to receive therebetween a quantity of commodity to be sliced whereby upon the rotation of said impeller members said commodity will be centrifuged against the inner smooth wall of said drum and forced to travel across the slicing knife disposed in said slot, and means for receiving and discharging a slice of the commodity as it passes through said slot, means disposed on the knife carrier for deflecting the slice to a gang of rotary cutters spaced apart and disposed beneath the underside of the slicing knife in cooperative arrangement with the slot and in position to receive the slice as it passes through said slot whereby to cut said slice into a plurality of elongated strips of predetermined cross-section, and means adapted to operate in the spaces between the rotary cutters for stripping the elongated strips therefrom.

5. In a device of the class described in combination with a support, a hopper for receiving a mass of vegetables or fruits to be cut, a drum having an opening communicating with said hopper to receive said contents, rotary impeller means mounted within said drum, said drum having relatively smooth inner wall surface over which said impeller means is adapted to sweep to centrifuge the commodity along and against said relatively smooth inner wall, said relatively smooth inner wall having an elongated slot-like opening therein, one of the wall portions of the inner wall of the drum being shiftable whereby to adjust the width of said slot, and the opposite edge of said slot being formed as a slicing knife extending transversely of the smooth inner wall of the drum, a gang of disc cutters disposed in spaced apart relation on the outside of the drum adjacent the slot and in position to receive a slice discharged through said slot by the passage of the fruit or vegetable across the slotted smooth wall, the drum at the under surface of the slicing knife being provided with inwardly extending abutments disposed between the rotary cutters for forcing the slice inwardly toward the central axis of the rotating disc cutters, and means for receiving the elongated strips discharged from the rotary cutters.

6. A slicing machine for slicing fruits and vegetables, comprising means providing an endless arcuate smooth wall provided with an aperture therein, said aperture having a slicing knife projecting thereinto with its cutting edge in line with the arcuate smooth wall, means for continuously centrifuging a fruit or vegetable against said wall, whereby to cause it forcibly to slide uninterruptedly in cyclic fashion along the inner smooth wall into contact with said knife, whereby repeatedly to cut slices of predetermined thickness from said fruit or vegetable, and means disposed in the path of a moving slice for cutting the slice into a series of elongated strips, said means likewise serving to assist the movement of the slice as it is being cut into strips.

7. A slicing machine for slicing fruits and vegetables, comprising means providing an endless arcuate smooth wall provided with an aperture therein, said aperture having a slicing knife projecting thereinto with its cutting edge in line with the arcuate smooth wall, means for continuously centrifuging a fruit or vegetable against said wall, whereby to cause it forcibly to slide uninterruptedly in cyclic fashion along the inner smooth wall into contact with said knife, whereby repeatedly to cut slices of predetermined thickness from said fruit or vegetable, and rotating cutting means disposed in the path of movement of the moving slice for simultaneously cutting it into a plurality of elongated strips.

8. A slicing machine for slicing fruits and vegetables, comprising means providing an endless arcuate smooth wall provided with an aperture therein, said aperture having a slicing knife projecting thereinto with its cutting edge in line with the arcuate smooth wall, means for continuously centrifuging a fruit or vegetable against said wall, whereby to cause it forcibly to slide uninterruptedly in cyclic fashion along the inner smooth wall into contact with said knife, whereby repeatedly to cut slices of predetermined thickness from said fruit or vegetable, and rotating cutting means disposed in the path of movement of the moving slice for cutting it into a plurality of elongated strips, said rotating cutting means moving in the same direction as the direction of movement of the elongated slices.

9. A slicing machine for slicing fruits and vegetables, comprising means providing an endless arcuate smooth wall provided with an aperture therein, said aperture having a slicing knife projecting thereinto with its cutting edge in line with the arcuate smooth wall, means for continuously centrifuging a fruit or vegetable against said wall, whereby to cause it forcibly to slide uninterruptedly in cyclic fashion along the inner smooth wall into contact with said knife, whereby repeatedly to cut slices of predetermined thickness from said fruit or vegetable, and rotating cutting means disposed in the path of movement of the moving slice for cutting it into a plurality of elongated strips, said rotating cutting means moving in the same direction as the direction of movement of the elongated slices, and means for moving said rotating cutting means at a greater speed than the speed of movement of the moving slices.

10. A slicing machine for slicing fruits and vegetables, comprising means providing an endless arcuate smooth wall provided with an aperture therein, said aperture having a slicing knife projecting thereinto with its cutting edge in line with the arcuate smooth wall, means for continuously centrifuging a fruit or vegetable against said wall whereby to cause it forcibly to slide uninterruptedly in cyclic fashion along the inner smooth wall into contact with said knife, whereby repeatedly to cut slices of predetermined thickness from said fruit or vegetable, a plurality of rotatable cutting means lying transversely to the plane of cut formed by the slicing knife and disposed in the path of movement of the slice as it is discharged from said slicing knife, and means for moving said slice in a direction inwardly toward the axis of rotation of said cutters and to a depth greater than the thickness of said slice, whereby completely to cut the slice into strips.

11. The hereindescribed apparatus for cutting vegetables, fruit and the like, which comprises a curved surface, means for moving a fruit or vegetable in a curved path over said surface, subjecting the fruit or vegetable to the action of a centrifugal force while moving in said curved path, means for cutting a flat slice from the fruit or vegetable while the latter is being centrifuged in said curved path, means acting on said slice while the slice is being centrifuged and while only partially severed for causing the slice to move in a path reversely curved with respect to said first-named curved path, a plurality of spaced rotating cutting discs, said plurality of cutting discs being disposed in said reversely moved path, means for rotating said blades in the direction of movement of the slice and at a peripheral speed higher than the speed imparted to the slice by said first-named means, for drawing the slice past the first-named cutter and severing it into strips.

12. In a machine for slicing fruits, vegetables and like substances, means forming a substantially closed curved surface guiding wall, means for continuously moving said substance in the same direction along said curved guiding wall and subjecting it to centrifugal force, said curved surface guiding wall having an opening therein, a stationary knife in said opening and having its cutting edge in line with said curved wall, means forming a second substance guiding wall positioned to guide said slices as they are being cut by said knife, means for actuating said moving means for rapidly moving the substance along said first wall and forcing it against a cutting edge of said stationary slicing knife to form a travelling slice along said second named wall and a plurality of moving knives in juxtaposition to the second substance guiding wall and located in the path of movement of said travelling slice, means for causing the cutting edges of the moving knives to move continuously in the same direction and at a higher speed than the speed imparted to the slice by the first named substance moving means for engaging and pulling each travelling slice past said stationary knife as the travelling slice is being cut and for further subdividing said slice.

WILLIAM E. URSCHEL.
JOE RICHARD URSCHEL.